Aug. 5, 1958

F. BAUER ET AL 2,846,634

ELECTROMECHANICAL CONTROL DEVICE

Filed March 12, 1956

United States Patent Office 2,846,634
Patented Aug. 5, 1958

2,846,634

ELECTROMECHANICAL CONTROL DEVICE

Franz Bauer and Hubert Naimer, Vienna, Austria; said Bauer assignor to said Naimer Application March 12, 1956, Serial No. 570,872

Claims priority, application Austria March 12, 1955

2 Claims. (Cl. 318—467)

The present invention relates to an electro-mechanical control device, particularly for remote control purposes, whereby a movable member, e. g. the control lever of a press, a valve or the like can be controlled sensitively, i. e. with high accuracy. It is not difficult to control simple movements, i. e. the stoppage or reversal of a carriage guided along straight lines (e. g. of the carriage of a table-type planing machine) by means of limit switches. The control of complex movements, however, involves often considerable difficulties. Whereas control devices designed for individual applications, whereby even complex movements, e. g. the movement of the control lever of a hydraulic press into its various positions, can be controlled without adherence to any predetermined sequence, it is an object of the invention to replace said single-purpose control devices by a control device which is of wide application so that it can be manufactured in quantity without regard to special applications.

Figure 1A:
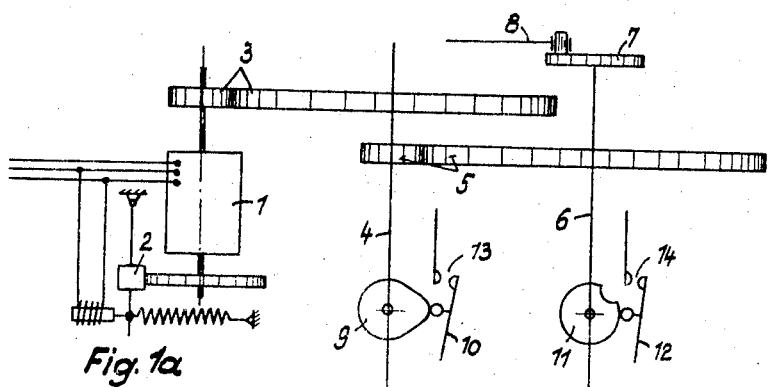

The control device according to the invention is characterized in that an electrical drive means, preferably an electric motor, drives at least two control shafts which are coupled to each other with a transmission ratio and one of which rotates at a higher speed than the following one, said control shafts having control switches associated therewith which will cause the drive means to stop if the control switches become effective at the same time, the time when one of said two switches becomes effective being predeterminable by a selectable adjustment of the angle of rotation of its control shaft between its initial position and the desired switching operation. The arrangement is suitably such that the first switching shaft switches once per turn and the second switching shaft has a number of switching positions corresponding to the transmission ratio between the shafts. Further details of the invention will be explained with reference to the diagrammatic drawings, in which Fig. 1a represents the main details of the mechanical part, Fig. 1b a detail of Fig. 1a and Fig. 2 a complete control device with an exemplary wiring diagram.

An electric motor 1 provided with a magnetic brake 2 acts through a speed reducer 3, represented here by gears, on a shaft 4 and from there by means of another speed reducer 5 on a second shaft 6, from which the mechanical drive may be derived e. g. by means of a crank 7 and a crank rod 8. Thus the problem resides in moving the outer end point of the crank rod 8, which may be assumed to slide in a straight guide, selectively to several positions, the order in which said positions are reached being selectable by the controlling operator.

The shaft 4 carries a control disc 9 for the switch 10 cooperating therewith. The shaft 6 carries a control disc 11 for the switch 12.

Whereas the speed reduction between the motor shaft and the shaft 4 may be of any desired ratio, a specific ratio is chosen for the reduction from the shaft 4 to the shaft 6 so that one turn of shaft 4 corresponds to a rotation of shaft 6 through a specific angle $\beta$. In Fig. 1a, $\beta$ equals 30 deg. This means a reduction ratio of 1:12. These relations are shown more clearly in Fig. 1b. Any other transmission ratio is conceivable, at least theoretically. The greater the transmission ratio, the more sensitive will be the operation of the control device, as will become apparent from the following explanations.

Figure 1B:
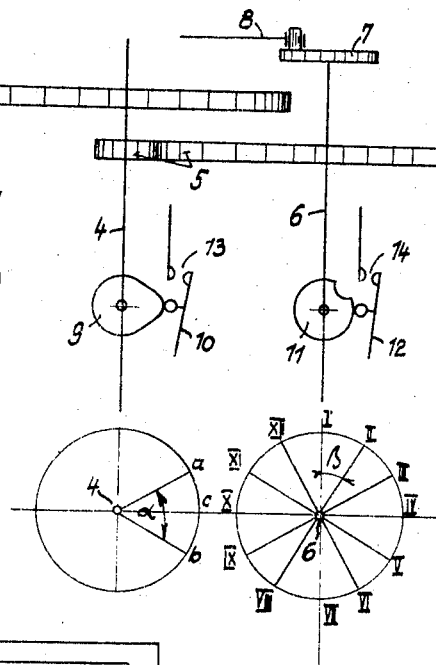

The switch 10, which is driven by the shaft 4 by means of the cam 9, consists in the simplest case essentially of a pair of contacts 13, which is open only during the angular range $\alpha$, Fig. 1b, of a full rotation of the shaft 4 whereas it is closed during the rest of the rotation. The angle $\alpha$ is determined by structural conditions and its limits are poorly defined. The invention provides independence of said limits, as will become more clear hereinafter. The pair of contacts 13 is a part of a circuit which controls the operation of the motor 1. For this reason it may either be a circuit containing the motor switch or, preferably, an auxiliary or control circuit. The wiring is such that when the motor has once been started by a closing of the pair of contacts 13 it will continue to run until the switch 10 opens under the influence of the control disc 9. Thus, if the motor 1 (having a selectable sense of rotation) is started aribtrarily by an external command, it will continue to run in that sense, and so will the shaft 4, until the contact 13 is opened at $a$ or $b$, depending on the sense of rotation of the motor, to interrupt the running of the motor, if desired by a contactor (not shown in Fig. 1). At the same time the brake magnet 2 becomes deenergized and brakes the motor 1 so that the shaft 4 comes to a standstill approximately in position $c$. The function of switch 13, which could be called a control switch, is also to exclude any external influences that could affect the operation of the motor as long as the shaft 4 is outside of the dead angle $\alpha$ after its rotation has been started; the switch 13 serves also to arrest the shaft 4 somewhere in the range $a$—$b$ and approximately at position $c$. For this reason the shaft 4 can perform only one or several entire revolutions. Thus the control switch 13 determines the size of the step measure of the control member 8, if that movement of the control member 8 which corresponds to one rotation of the shaft 4 is considered the smallest incremental step which can be performed. This is so because the movement of the shaft 4 is transmitted by the gear train 5 to the shaft 6 and the crank disc 7. (The variation of the size of the step by the crank drive may be disregarded here.) In accordance therewith the drive shaft 6 may be turned in any desired sense only by an angle $\beta$ or a multiple thereof. The switch 12 which is operated by the control disc 11 and whose contact pair is designated by 14 lies in an auxiliary circuit designed to arrest the motor only when the contact pair 14 is closed and the contact pair 13 is opened at the same time. This means that when the switch 10 is open (pair of contacts 13 open) and the switch 12 is open too the motor will continue to run, being kept in operation by the auxiliary circuit including the switch 12 until the switch 10 is open and the switch 12 is closed. The switch 12 is arranged so that the position in which the pair of contacts 14 is closed by the control disc 11 is selectable among positions I—XII. Thus the control switch 14 enables the closing of contacts in the angular positions I—XII which are selected as being essential for the mechanical drive so that the drive disc 7 is arrested in the respective position desired by means of the contactors in agreement with the external commands. Thus the switch 12 determines the desired number of steps.

The contact operation in the control switch 12 may be relatively slow without disadvantage for the programming because the control switch 10 ensures that the contacts 14 of the control switch can be effective only in the switching positions I—XII, not between the same. Thus it is apparent that the switch 12 with its contact 14 must be constructed to be selectively effective in any of positions I—XII. This is a simple mechanical-electrical problem, for which an advantageous solution will be disclosed hereinafter.

If the motor 1 is combined with the brake 2 and the reducers 3, 5 to form a unit and flanges are provided for flanging the control switches 10 and 12 to the shafts 4 and 6, respectively, so that the control switches being composed of unit elements enable the setting of any desired contact sequence, the control device may be conveniently adapted to the respective requirements of the machine or the like which is to be controlled. At the same time the device may be given a construction which can be manufactured, e. g., in a number of different sizes. The drive shaft 6 is arranged to extend from that unit. It may serve directly for driving the member to be moved or may act on the same by additional speed increasing or speed reducing transmissions.

An electrical control device has been disclosed which serves for controlling a plurality of electrical circuits successively in a selectable sequence, for instance, in a machine provided with a larger number of electrically moved parts in order to render the same effective or ineffective in a certain sequence. In order to fulfill that task with the greatest possible independence of a certain switching program it has been suggested to provide at least two contacts for each circuit to be controlled and to arrange the appertaining control cams on two cylinders which can rotate incrementally so that one cylinder performs a full rotation for each step of the other cylinder. Each of the two cylinders is driven by an electric motor and the motors are electrically controlled in accordance with the desired program by means of the appertaining cylinders.

The present case does not concern a programming switch and, principally, does not concern a switching device at all but a mechanical drive with an electrical remote control system. According to the prior proposal the arrangement of the two cylinders causes the programming switch to be divided into two separate columns, whereas in the present case the two cam switches serve to remotely control a drive shaft so that an exactly defined rotation of the drive shaft will correspond to a certain control command. In the present case the two cam switches are mechanically coupled by a transmission.

Figure 2:
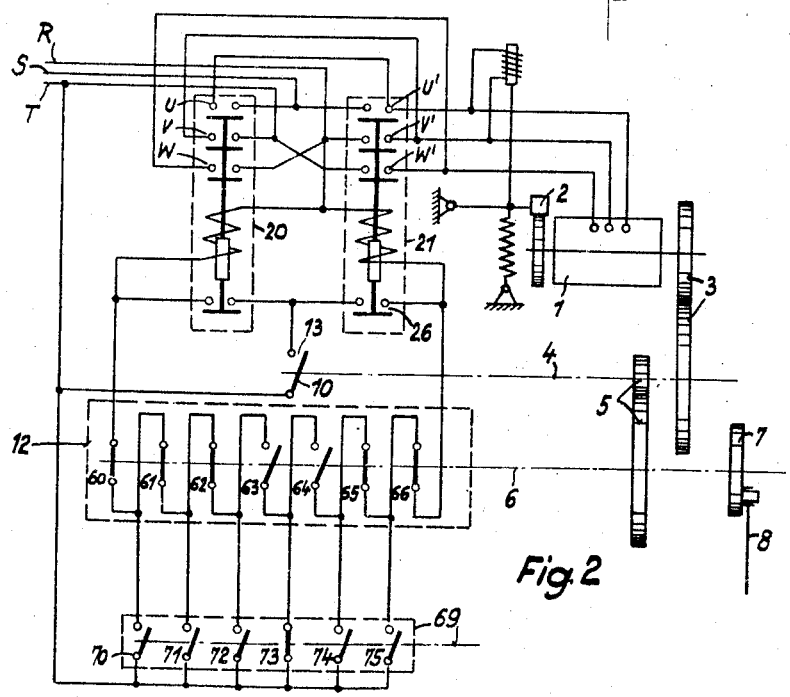

Fig. 2 is a simplified wiring diagram of the electrical part required in connection with the previously described part of the control device according to the invention.

The two contactors operate as reversing switches and by their main contacts U, V, W and U', V', W', connect the drive motor 1 to the supply R, S, T if the magnet coils of the contactors are energized. The supply phases are transposed so that the motor 1 will run in one or the other sense if one or the other contactor is operated. The brake magnet 2 is energized at the same time as the motor to lift the brake. One end of the two contactor coils is connected to R, whereas the other end may be connected from the outside to the phase T by way of the contacts of the control switch 10 or control switch 12 and by way of the command contacts 70—75. In the example the control switch 10 has only one pair of contacts, which is controlled by a cam 9 connected to the control shaft 4 (see Fig. 1) and is open only in the dead zone α whereas it is closed in all other positions (see Fig. 1).

The control switch which is designated 12, 14 in Fig. 1 and which is required to operate in at least twelve positions and is controlled by the shaft 6 is shown with seven contacts in Fig. 2, to save space. This does not make a fundamental difference compared to Fig. 1 whereas in the latter β=30 deg., β would be 360/7 or 51 deg. in a construction with seven positions. The seven contacts designated 60—66 are connected in series and operate in such a manner that in each position of the drive shaft 6 at the end of a step two adjacent contacts are opened and all others are closed. In position I of the drive shaft 6 the contacts 60 and 61 are opened, in position II the contacts 61 and 62 are opened etc. In the wiring diagram shown the drive shaft 6 is in position IV (where a total of seven positions are provided for) so that the contacts 63 and 64 are open.

The commands are impressed upon the control device by a hand-operated command switch, which consists in the present case of a simple step-by-step switch having six positions so that in each position of the switch one contact is closed whereas all others are opened. In the wiring diagram that control switch, whose shaft is designated 69 and which comprises the contacts 70—75, is in position IV so that the fourth contact 73 is closed and all others are opened. The control device is at rest because in correspondence with the command IV of the command switch 69 the drive shaft 6 is in position IV and the phase T is fed by means of the command contact 73 to the control switch 12 controlled by the drive shaft 6 whereas the opened contacts 63 and 64 of the latter interrupt the connection to the contactors 20 and 21. The control switch contact 13 is opened too. When the control switch 69 is now actuated by hand, e. g. is moved into position V to close the contact 74 and open the contact 73, the contactor 21, serving as a forward contactor, is energized by means of the contact 74 of the command switch 69 and the contacts 65 and 66 of the control switch 12 and pulls up. Thus the motor is started by U', V', W' in that sense which corresponds to a rotation of the drive shaft towards position V. After a short circuit closing period the cam of the control switch 10 leaves the dead zone α (Fig. 1) and the pair of contacts 13 close. During the continued movement of the drive shaft 6 from position IV to position V the contactor 21 is thus maintained energized by means of its holding contact 26 until the drive shaft 6 has reached position V.

In the meantime the contact 63 has been closed and the contact 65 has been opened whereas the contact 64 remains opened in the control switch 12 controlled by the shaft 6. The control cam carried on the shaft 4 moves now into the dead zone α, whereby the contact 13 is opened. Now the contactor 21 cannot be energized through either of contacts 73 and 13. Thus the contactor 21 is deenergized and disconects the drive motor. The brake being applied at the same time causes the drive shaft of the control device to be at a standstill exactly in position V. When now, e. g., the command switch 69 is moved into position II, the contactor 20, serving as reverse contactor, will pull up and the process will take place in the opposite sense of rotation until the drive shaft is in position II. Thus the command switch 69 and the control switch 14 check each other, whereas the control switch 10 ensures that the step measure is maintained.

As is apparent the command switch 69 may be arranged at a distance from the rest of the device as a command device which is connected to the rest of the control device by a multiconductor cable. The external command operation, which has been effected here with the aid of a simple step-by-step switch, may be varied in many ways and may conveniently be adapted to the actual requirements.

The circuit shown in Fig. 2 must be considered a simplified basic circuit, in which all confusing details have been omitted, such as the mutual interlocking of the two contactors, safety provisions preventing an overrunning of the desired end position in the case of brake failure, position preselection with subsequent pulse-controlled beginning of operation, etc. By a simultaneous closing of two contacts of the command device the control device may be caused to oscillate continually between said two positions. The external command operation which has been performed here with a simple step-by-step switch, may be carried out in many ways and may conveniently be adapted to the actual requirements.

It is not difficult to derive several variants of the mechanical part of the control device from the basic form shown. From the mechanical aspect the speed reduction may be effected by means of stepped gears, planetary gears, worm gears and the like. The motor may be braked by a stop motor. One turn of the shaft 4 could be subdivided several times into running and dead zones, whereby the transmission ratio between the shafts 4 and 6 can be carried by strictly electrical means. With the same electrical arrangement the programming will not be changed if the shaft 4 rather than the shaft 6 is used as an output shaft, from which the control movement is derived. This will be desirable if the desired control movement requires larger angular movements. The motor shaft itself or an auxiliary shaft driven thereby over a speed reducer could also be used for the mechanical drive. It is also possible to construct one or both control switches partly as trailing switches to vary their mode of reaction in dependence on the sense of rotation. Another variant would reside in an increase in the number of electrically controlled shafts with a fixed transmission ratio if this is desirable for the program control. Finally it could be of advantage for special purposes to use intermittent rather than continuous speed reducers, e. g. in the form of a Maltese cross mechanism.

The nature of the invention is seen in the cooperation of at least two matched switching devices 10, 12, Fig. 1, which are operated by means of coupled drive shafts driven with a speed ratio. It is not essential whether the switching impulse is initiated by an opening or closing of the circuits associated with said switches, whether the drive means, which need not necessarily be a motor in the usual sense, is disconnected directly or by means of contactors. Nor is it necessary to effect the command operation by means of the command switch 69 by hand (Fig. 2). This may also be effected by means of special drives, which perform programs prescribed by punched cards or the like.

We claim:

1. An electromechanical control device for producing defined and predeterminable mechanical movements, comprising an electrical drive means, a first shaft arranged to be driven by said drive means, a speed reducer, a second shaft coupled by said speed reducer to said first shaft, first and second control switches operable by said first and second shafts respectively, means for varying the angle of rotation of said second shaft between an initial position and a position in which it operates said second control switch, and means arranged to stop said drive means in response to both said control switches being effective at the same time.

2. A control device as set forth in claim 1, in which said second control switch comprises a rotary switch coupled to said second shaft and having a plurality of contacts, each of which is arranged to be operated in a predetermined position of said second shaft, and said means for varying the angle of rotation comprise a command switch for bridging selectable contacts of said rotary switch.

References Cited in the file of this patent

UNITED STATES PATENTS 2,522,222    Haller _____ Sept. 12, 1950